United States Patent Office 2,786,788
Patented Mar. 26, 1957

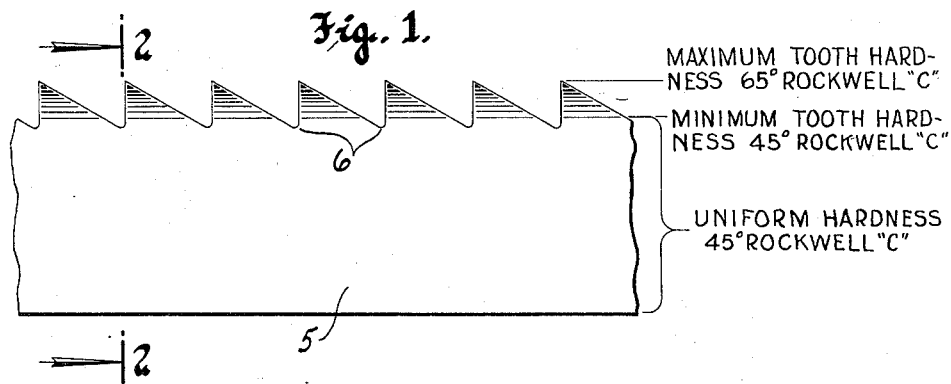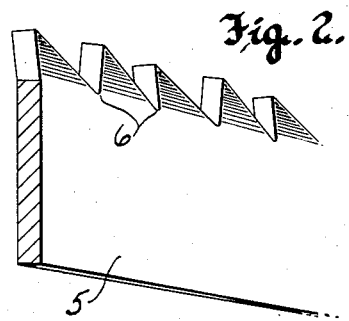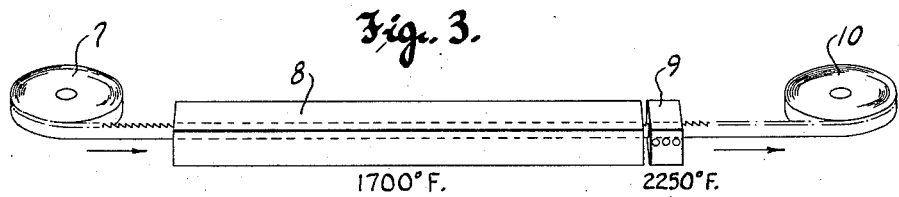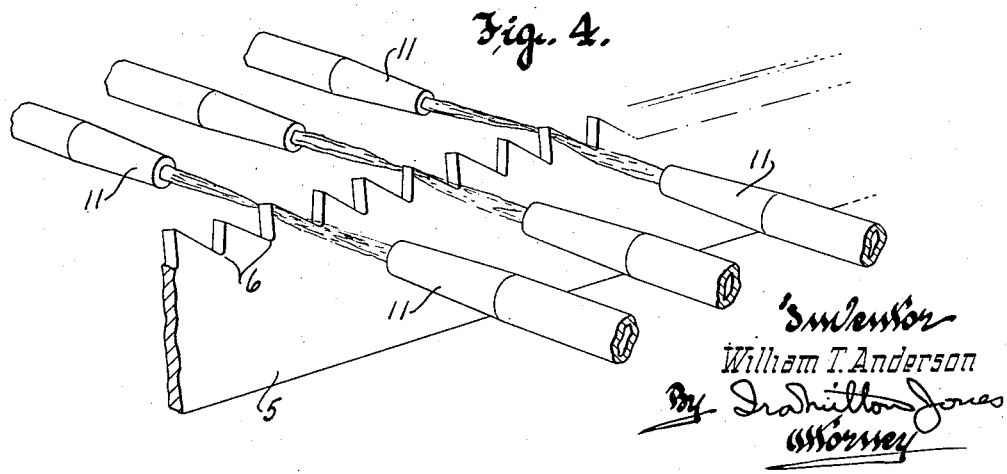

2,786,788

HIGH SPEED TOOL STEEL SAW BAND AND METHOD OF MAKING THE SAME

William T. Anderson, Des Plaines, Ill., assignor to The DoAll Company, Des Plaines, Ill., a corporation of Illinois Application November 16, 1953, Serial No. 392,278

5 Claims. (Cl. 148—21.55)

This invention relates generally to the art of heat treating steel and refers more particularly to the hardening of saw bands, saw blades and other tools, as for instance knives, made of high speed tool steel.

The purpose of this invention is to provide a commercially practicable technique by which such tools and especially saw bands can be given an extremely hard cutting edge which will maintain its hardness even at elevated temperatures and a tough body or back. While the combination of an extremely hard cutting edge with a tough back is of advantage in all tools of the type mentioned, for obvious reasons it is especially valuable in saw bands used in metal cutting band saws.

The hardness contemplated for the cutting edge is on the order of 65 Rockwell C and for the back, 45 Rockwell C, and while high carbon steel may be hardened to 65 Rockwell C its inability to maintain hardness at elevated temperatures constitutes a serious disadvantage. Accordingly, metal cutting tools are preferably and usually made of high speed tool steel. But despite the well known advantages of high speed tool steel, as far as is known, no one heretofore has ever commercially produced saw bands made therefrom.

Where the combination of a tough resilient back and extremely hard teeth capable of withstanding high temperatures without loss of hardness has been attained in the past, it was found only in hack saw blades, and upon best information and belief was accomplished on a commercial scale only by the expedient of welding a narrow strip of tool steel onto a wider band of low carbon steel as taught in the Blum Patent No. 1,535,096 issued in 1925.

The instances in the prior art where the desideratum has been approached from the standpoint of a special heat treatment for a blade made entirely of tool steel find representation in the Napier Patent No. 1,333,767 issued in 1920, the Pavitt Patent No. 2,326,674 issued in 1943, and the Mittelmann Patent No. 2,371,459 issued in 1945 but apparently these prior attempts never succeeded in solving the problem, at least they never did result in the production of commercially practicable saw band made entirely of high speed tool steel.

The present invention does achieve this objective. It provides a technique which has been demonstrated to be commercially practicable for producing saw band for metal cutting band saws (and of course, hack saw blades, knives and similar tools) possessing the desired combination of extremely hard teeth and a tough resilient back, from a single homogeneous strip or band of high speed tool steel.

Though the art no doubt fully understands what is meant by the term "high speed tool steel," to assure against any ambiguity in this respect it is understood that where this term is used herein, it means broadly any of the present-day steel alloys which, in addition to iron and chromium, generally contain tungsten, molybdenum, vanadium, carbon, manganese and silicon, the proportions of these various elements varying with different formulae. For a more specific understanding of the type of steel contemplated in the practice of this invention one representative composition, known as molybdenum high speed steel and commonly referred to as M–2, is as follows:

| | |
|---|---|
| Carbon | .79–.86%. |
| Manganese | .35% (max.). |
| Silicon | .40% (max.). |
| Chromium | 3.90–4.40%. |
| Molybdenum | 4.75–5.25%. |
| Vanadium | 1.75–2.05%. |
| Tungsten | 6.00–6.75%. |
| Phosphorus | .03% (max.). |
| Sulphur | .03% (max.). |
| Iron | Balance. |

Another example, known as tungsten type high speed steel, and commonly referred to as 18–4–1, is:

| | Percent |
|---|---|
| Carbon | .70 |
| Manganese | .3 |
| Silicon | .25 |
| Chromium | 4.0 |
| Vanadium | 1.0 |
| Tungsten | 18.0 |
| Iron | Balance |

It is a characteristic of such high speed tool steels that a degree of partial hardness can be obtained by heating the steel to a selected temperature below its maximum hardness producing temperatures sometimes referred to as the critical conversion point, at which the steel undergoes a metallurgical transformation. Ordinary carbon steels on the other hand generally are not amenable to this type heat treatment, and where they are, the temperature to which they must be heated to bring about a hardness of for instance 45 or 50 Rockwell C is so close to the critical temperature (at which maximum hardness is obtained) that the attainment of such partial hardness by this method is a practical impossibility. Therefore, when partial hardness is desired in carbon steel it is usually obtained by heating the steel to the maximum hardness producing temperature and then bringing the hardness down to the desired level by tempering.

As will appear hereinafter this difference between high speed tool steels and ordinary carbon steels plays an important part in the attainment of the object of this invention.

In general the method of this invention comprises:

1. In any suitable manner and by any suitable means forming the teeth on one edge of a strip or band of tool steel having the desired dimensions and a hardness of no more than approximately 30 Rockwell C. This is the average maximum hardness of high speed tool steel as it is received from the steel mill and, of course, at such hardness it is easily machined.

2. Setting the teeth in any suitable manner, if the saw band to be produced is of the type requiring the teeth to be set.

3. Heating the strip or band with its formed and set teeth to the temperature which will result in the selected less-than-maximum hardness. Where this desired partial hardness is on the order of 45 Rockwell C a temperature of approximately 1700° F. is correct for steels having the composition indicated. This heating may be done in any suitable way, but since continuous production is desirable, the band is preferably moved endwise through a suitably heated elongated furnace at a rate of travel which will assure uniform heating of the band to the selected temperature.

4. While the band is at said selected temperature (approximately 1700° F.) or as close thereto as possible, it is passed through a second heating zone where only the teeth are heated to the critical conversion temperature of the steel. For steel of the compositions given hereinbefore this is approximately 2250° F. This heating of the teeth alone may be effected in any suitable manner and for purposes of illustration it may be done by playing pinpoint-like flames onto the tips of the teeth as the band passes through the second heating zone. During the heating of the teeth no attempt is made to in anywise shield the back or body of the strip or band from the heat applied to the teeth since no such protection is needed.

5. Upon leaving the second heating zone the band is allowed to cool in still air for about one hour.

6. It is then tempered to relax its internal structure and reduce the percentage of any retained austenite. Two or three successive tempering and cooling operations conducted in the customary manner are usually sufficient.

The saw band thus produced from steel of the aforesaid compositions will have a hardness of about 65 Rockwell C at the tips of the teeth tapering down to about 45 Rockwell C at or just above the roots or gullets of the teeth, and a uniform hardness of about 45 Rockwell C for the full width of its back. The level in the height of the teeth at which minimum hardness obtains can be determined by adjustment of the point at which the heat is applied to the teeth and by relative correlation of the intensity of the heat and the time for which the teeth are subjected thereto.

An important observation in connection with the heating of the teeth is that since the band enters the second heating zone already heated to a substantial temperature, the intensity of the heat which must be applied to the teeth to bring about maximum hardness need not be as great as it would have to be if the band entered the tooth hardening zone unheated or heated to a temperature of about 500° F. to 600° F. to which it might be heated in prior art practice for the purpose of imparting a blue color thereto. Accordingly, there is far less likelihood of flame polishing taking place and as a result there is no impairment of the sharpness of the teeth. Also, the relatively small temperature differential (550° F.) between the back and the teeth at the time the teeth are heated enables the teeth to be brought to the critical temperature in a very short time so that the band is out of the tooth heating zone before the temperature of its back is increased. This assures the obtention of the desired spring-like quality for the back while at the same time the teeth are given the desired hardness ranging from about 65 Rockwell C at the tips to the partial hardness of the band just above or at their gullets.

It should also be noted that this differential between the critical hardening temperature (2250° F.) and the partial hardening temperature (1700° F.) though small enough to assure very rapid heating of the teeth to the critical temperature by means of a relatively "soft flame" or other not-too-intense heat source, nevertheless is still great enough to be easily maintained in practice. In other words, during the initial heating of the band to its partial hardening temperature, there is no danger of having the temperature reach the critical conversion point at which maximum hardness results.

It will be appreciated that, although the band leaves the second heating stage with its teeth at a temperature of about 2250° F. the extremely small mass of the teeth as compared to the mass of the back assures that the heat in the teeth will be quickly dissipated into the back without effectively raising the temperature of the back. The cooling of the band is thus quite rapid.

If desired, the rate at which the band cools may be controlled, but normally this is not necessary and no effort need be made to either increase or decrease its temperature. Letting it pass into still air at room temperature is enough. In practice it has been found that if the band moves from the second heating zone directly into an ambient temperature of 70° to 80° F. the temperature of the entire band, including the teeth, drops to somewhere in the neighborhood of 1600° F. within two or three seconds and in a matter of a few minutes its temperature is near 800° F.

In view of this rapid cooling it is entirely practical to wind the band into a coil shortly after it leaves the second heating zone and then allow the coil to rest at room temperature preparatory to tempering which should be done within about one or two hours.

Before tempering the steel of the band usually has considerable retained austenite, and as is well known its internal structure is very unstable, but through the succession of tempering and cooling operations internal stresses are relieved, and the percentage of retained austenite is reduced to about ten percent (10%) without loss of hardness. In fact, as is known to the art, it is even possible to so conduct the tempering operations that the final hardness of the teeth will be slightly higher than the hardness attained during the heat treatment.

Though the nature of the finished product of this invention and the method of producing it are no doubt clear from the foregoing description, for convenience the accompanying drawing has been provided, and in which:

Figure 1 is a side view of a short length of saw band made in accordance with this invention;

Figure 2 is a cross sectional view taken through Figure 1 on the plane of the line 2—2;

Figure 3 is a view diagrammatically illustrating the progress of the band successively through the two heating zones; and Figure 4 is a detail view illustrating one manner of heating only the teeth of the band.

As indicated in Figures 1 and 2, the entire back 5 of the band, that is the portion thereof lying between the gullets of the teeth 6 and the back edge of the band, and also the adjacent base portion of the teeth, preferably has a uniform hardness of about 45 Rockwell C, while the teeth of the band range in hardness from a maximum of about 65 Rockwell C at the tips to about 45 Rockwell C just above their gullets and, of course, the entire band is formed from one homogeneous strip of high speed tool steel.

In Figure 3 the band is shown being unwound from a coil 7 and passing successively through the first heating zone 8 and then directly into the second much shorter heating zone 9. In the first zone the entire band is uniformly heated to a temperature which will result in the selected less-than-maximum hardness, and which for steel of the compositions given and for a selected partial hardness of 45 Rockwell C is approximately 1700° F. In the second zone 9 only the teeth are heated to the maximum hardening temperature which for the type of steel here contemplated is in the neighborhood of 2250° F.

Merely for purposes of illustration and not limitation, it has been found that for three-quarter inch bands or thereabouts and with the band moving at a rate of about 480 feet per hour the first heating zone 8 should be in the neighborhood of thirteen feet (13′) long, and the second heating zone 9 should be only about four inches (4″) long, and, of course, as close as practicable to the first heating zone so that the band does not lose heat in moving from one zone into the other.

After leaving the second heating zone 9 the band is rewound into a coil 10 in which condition it is allowed to cool and rest until it is tempered. As already described, though the heating of the teeth may be accomplished in any suitable manner, the use of pinpointed flames issuing from two rows of nozzles 11 arranged at opposite sides of the path of the band and positioned to impinge only the tips of the passing teeth, as shown for instance in Figure 4, is one way this may be done.

From the foregoing description taken in connection with the accompanying drawing, it will be readily apparent to those skilled in this art that this invention provides a commercially practicable technique for making saw band for metal cutting band saws entirely of high speed tool steel and that the band of this invention possesses all of the attributes always sought but heretofore never achieved in saw bands, namely extremely hard cutting teeth which will not lose their hardness even at elevated operating temperatures and a tough resilient back fully able to be trained over pulleys of reasonable diameter (16 inches for instance) and possessing high fatigue resistant characteristics with an assurance against the shrapnel-like shattering which characterizes the breakage of an all-hard piece of tool steel.

It will also be readily apparent to those skilled in the art that although this invention is especially useful in the production of saw bands it is likewise advantageous in the manufacture of hack saw blades and perhaps also knives or other similar tools; accordingly where the term "saw blade" is used herein and in the claims it is understood to be generic to both saw band used in band saws and hack saw blades.

What I claim as my invention is:

1. The method of making saw blade from a homogeneous strip of high speed tool steel, which comprises: forming teeth along one edge of the strip while the strip is in an unhardened condition; heating the strip uniformly across its entire width to the temperature needed to bring about a hardness of about 45 Rockwell C in the finished product; directly after such heating and while the strip is at substantially the temperature to which it has been heated, heating the teeth without raising the temperature of the strip below the gullet line of the teeth, to the temperature needed to bring about a hardness in the teeth ranging from about 65 Rockwll C at the tips of the teeth to about 45 Rockwell C at the gullet line of the teeth; allowing the strip to cool; and tempering the strip to relax its internal structure and reduce the percentage of retained austenite.

2. The method of making saw blade from a homogeneous strip of high speed tool steel, which comprises: forming teeth along one edge of the strip while the strip is in an unhardened condition; heating the strip uniformly across its entire width to a temperature of approximately 1700° F. to bring about a partial hardening of the strip and give the finished product a spring-like quality; directly after such heating and while the strip is at substantially the temperature to which it has been heated, heating the teeth without raising the temperature of the strip below the gullet line of the teeth, to a temperature of approximately 2250° F. to bring about maximum hardness in the teeth without affecting the degree of partial hardness of the strip below the gullet line of the teeth; allowing the strip to cool; and tempering the strip to relax its internal structure and reduce the percentage of any retained austenite.

3. The hereindescribed method of hardening a tool such as a saw blade made entirely from a homogeneous strip of high speed tool steel, which method is characterized by: two directly successive heating operations, in the first of which the strip is heated uniformly across its entire width to the temperature needed to bring about a hardness of about 45 Rockwell C in the finished tool; and in the second of said heating operations only the edge portion of the strip which is to provide the cutting edge of the tool is heated to the temperature needed to bring about a hardness of about 65 Rockwell C at the extreme edge of the tool, said second heating operation being conducted while the strip is at substantially the temperature it possesses upon leaving the first heating operation.

4. The hereindescribed method of hardening a tool such as a saw blade made entirely from a homogeneous strip of high speed tool steel, which method is characterized by: two directly successive heating operations; in the first of which the strip is heated uniformly across its entire width to approximately 1700° F. to bring about a partial hardening of the strip and give the finished tool a spring-like quality; and in the second of said heating operations only the edge portion of the strip which is to provide the cutting edge of the tool is heated to approximately 2250° F. to bring about maximum hardness of the cutting edge of the tool, said second heating operation being conducted while the strip is at substantially the temperature it possesses upon leaving the first heating operation.

5. As an article of manufacture: a saw blade made entirely of high speed tool steel by the method set forth in claim 1.

References Cited in the file of this patent

UNITED STATES PATENTS

| | | |
|---|---|---|
| 1,333,767 | Napier | Mar. 16, 1920 |
| 1,526,894 | Bellis | Feb. 17, 1925 |
| 2,371,459 | Mittelmann | Mar. 13, 1945 |
| 2,444,259 | Jordan | June 29, 1948 |
| 2,564,906 | Kineard et al. | Aug. 21, 1951 |

FOREIGN PATENTS

| | | |
|---|---|---|
| 1,035,652 | France | Apr. 22, 1953 |